United States Patent [19]

Lhommeau et al.

[11] Patent Number: 4,478,563
[45] Date of Patent: Oct. 23, 1984

[54] APPARATUS FOR UPWARDLY EXTRUDING AND COOLING A THERMOPLASTIC RESIN MULTIPLE TUBE STRUCTURE

[75] Inventors: Robert E. Lhommeau, Savigny Sur Orge; Ducruy Guy R., Varces, both of France

[73] Assignee: Indumat S.A., Wissous, France

[21] Appl. No.: 315,281

[22] Filed: Oct. 27, 1981

[30] Foreign Application Priority Data

Oct. 30, 1980 [FR] France ................ 80 23188

[51] Int. Cl.³ .............. B29C 25/00; B29D 23/04; B29F 3/04; B29F 3/08
[52] U.S. Cl. ......................... 425/71; 264/40.7; 264/150; 264/209.7; 425/139; 425/308; 425/382 R; 425/464; 425/467
[58] Field of Search .......... 264/51, 53, 209.7, 209.1, 264/557, 558, 40.7, 173; 425/382 R, 464, 150, 139, 71

[56] References Cited

U.S. PATENT DOCUMENTS

| | | | |
|---|---|---|---|
| 2,898,627 | 8/1959 | Bley et al. | 425/88 X |
| 2,987,776 | 6/1961 | Miller et al. | 264/558 |
| 3,038,202 | 6/1962 | Harkenrider | 425/464 |
| 3,121,760 | 2/1964 | Kline | 264/51 |
| 3,616,018 | 10/1971 | Komoly | 156/244 |
| 3,792,951 | 2/1974 | Meyers | 425/326 |
| 3,825,641 | 7/1974 | Barnett | 425/326 X |
| 3,864,444 | 2/1975 | Johnson | 264/53 X |
| 3,955,906 | 5/1976 | Murase et al. | 425/88 |
| 4,036,930 | 7/1977 | Murai et al. | 264/40.7 X |
| 4,072,453 | 2/1978 | Oltmanns et al. | 425/88 X |
| 4,271,103 | 6/1981 | McAlister | 264/558 X |

FOREIGN PATENT DOCUMENTS

| | | | |
|---|---|---|---|
| 575835 | 5/1959 | Canada | 264/558 |
| 269877 | 2/1914 | Fed. Rep. of Germany | 425/464 |
| 1154853 | 4/1958 | France | 425/382 |

Primary Examiner—Philip Anderson
Attorney, Agent, or Firm—Brisebois & Kruger

[57] ABSTRACT

The present invention concerns manufacture of cellular structures of thermoplastics material. In particular the invention concerns apparatus for use in the production of cellular structures of thermoplastics material comprising a supply and injection stage (b) for supplying the thermoplastics material (12), a die stage (c) through which the thermoplastics material supplied by the supply and injection stage is extruded to form the cellular structure (15), and a cooling stage (d) supplied in use with cooling fluid (4) for cooling the extruded thermoplastics material, the different stages being located one above the other and the apparatus further comprising a plurality of regularly spaced cylinders (7), each cylinder (7) having a lower part (10) of lesser diameter provided with heating means (11) and an upper part (8) of greater diameter, the bodies of the cylinders extending through the supply and injection stage and the upper parts thereof forming said die stage. The invention is particularly applicable to the manufacture of cellular structures of large dimensions for buildings.

8 Claims, 8 Drawing Figures

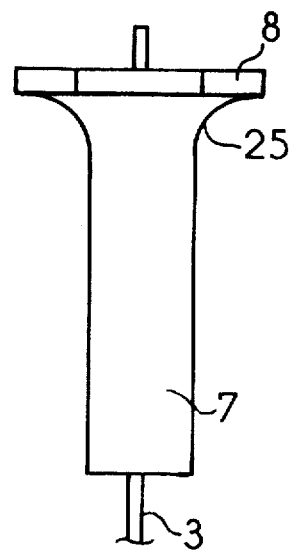
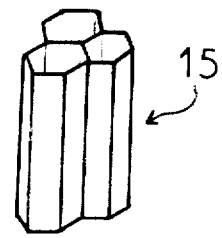
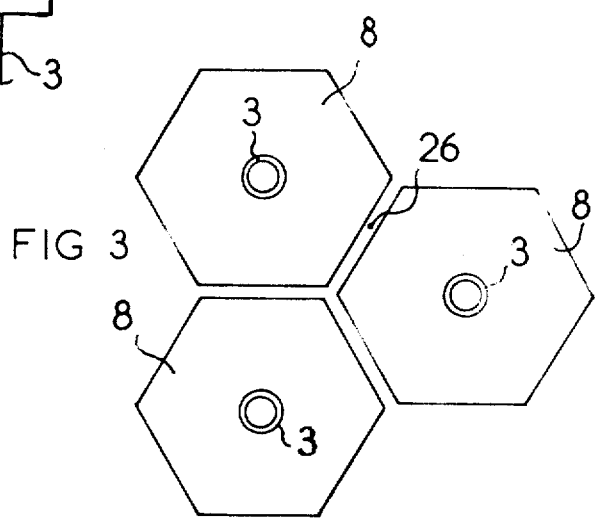
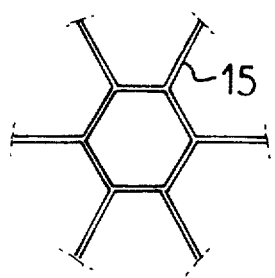
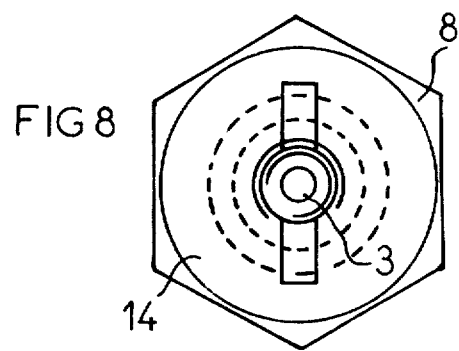

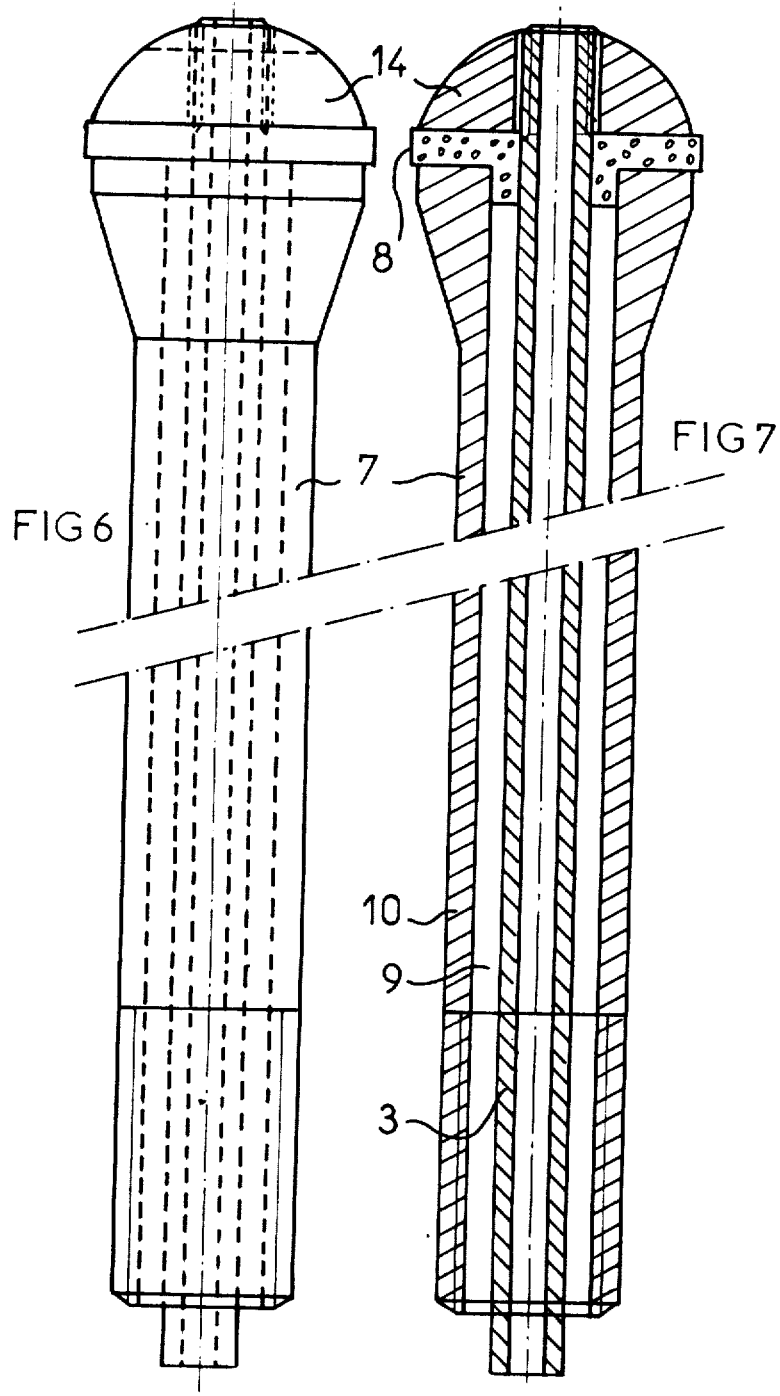

APPARATUS FOR UPWARDLY EXTRUDING AND COOLING A THERMOPLASTIC RESIN MULTIPLE TUBE STRUCTURE

BACKGROUND OF THE INVENTION

The present invention relates to a device for producing multiple tube or multiple channel structures of thermoplastic material. These structures can be defined, in a general manner, in the following way: they are structures formed by tubes or channels which are parallel, contiguous and separated by thin or thick walls. The form of the tubes or channels can be the surface described by a straight line or generatrix displaced parallel to itself while following a closed curve referred to as a directrix. The shape of the directrix can be round, oval, elliptical or polygonal, for example. The directrix form especially preferred is the hexagon, the multi-channel structure thus defined then being of the honeycomb type.

DISCUSSION OF THE PRIOR ART

Structures of the aforesaid kind and produced from thermoplastic materials are already known. As a rule, they are obtained by processes of two kinds. The first process consists in starting from a sheet of plastics material and using heat-moulding. A process of this kind cannot be applied in continuous manner, it requires a sizeable plant and substantial modifications must be made to change the form of the structure produced. Moreover, in accordance with a process of this nature, the height or length of the channels is limited.

The second process consists in injecting a softened thermoplastic material into a closed mould, the product setting thanks to a cooling operation on the walls of the mould which follows the injection stage. This second technique cannot, by definition, be applied except piece-by-piece and it is thus impossible to envisage a continuous application. Furthermore, in accordance with this second process a complex plant is necessary if it is wished to obtain multiple channel structures having thin walls and large dimensions.

Finally prior art devices are known for the production of mulitple channel structures which allow continuous production and which commonly comprise a plastics material feed stage, a die stage for extrusion of the plastics material, and a cooling stage for the multiple channel product obtained and which is supplied with a cooling fluid; the different stages being situated one above another and the die stage being formed by evenly spaced apart cylindrical elements. Devices of this kind are described in particular in the following patents:

U.S. Pat. No. 3,616,018
U.S. Pat. No. 3,825,641
French Pat. No. 78 33678
French Pat. No. 74 30736
U.S. Pat. No. 3,792,951
U.S. Pat. No. 3,038,202

The devices described and illustrated in these patents render it possible to produce multiple channel structures of the said kind, but have the disadvantage that the dimensions of the obtainable products are still extremely limited, meaning that the number of channels which may be produced at the same time remains very small.

As a matter of fact, to obtain appropriate practical results in the case of elements of large size, it is essential that the supply of thermoplastic material should be perfectly uniform in respect of temperature and pressure. It is equally necessary that the cooling action should be performed right at the outlet from the extrusion stage and this in uniform and homongenous manner for each of the individual channels.

None of the prior art devices cited in the foregoing allow an operation of this nature, and the dimensions of the products obtainable remain very small.

In accordance with the U.S. Pat. No. 3,616,018 for example, the extrusion device (see FIG. 4) comprises a single feed 2 for the totality of the individual channels which are to be produced, and the extruded product is then cooled in a separate device comprising external cooling plates 4 (FIG. 1). Moreover, at the level of the extrusion device 1, air is fed into a common chamber 16 and from the latter via longitudinal passages 13 situated in each tubular element 14 forming the extruder.

It is clearly apparent that, in this case, the supply of thermoplastic material is not homogenous throughout the dimensions of the extruder; analogously, the temperature and pressure of the air fed from the chamber 16 and through the ducts 13 also varies from one tubular element 14 to another, so that it is impossible to envisage the production of elements of large dimensions.

Analogously, the operation of cooling by means of a separate device causes the same results and moreover raises the risk of a deformation of the structure obtained between the extruder and the cooling device.

To eliminate the last disadvantages, the U.S. Pat. No. 3,825,641 makes use of a forming device at the outlet of the extrusion head, which is intended to guide the product obtained during its cooling to assure the stability of its geometrical configuration.

The device described in the French Pat. No. 78 33678 has the same disadvantages.

In the device according to the French Pat. No. 74 30736, so-called calibrating devices are incorporated to assure the geometrical stability of the extruded product during its cooling.

Finally, a device is described in the U.S. Pat. No. 3,038,202, which comprises an extrusion head, cooling means and separate calibrating or sizing means, and in which the heating and cooling operations are provided simultaneously for the totality of the individual channels produced, that is to say in an inhomogenous manner.

OBJECTS OF THE INVENTION

Considering the empty spaces they contain and the multiple walls defining them, the multiple channel structures of the type described in the foregoing have considerable heat and noise insulation qualities and mechanical properties which are of interest. As a result, such multiple channel structures are sought after for building purposes, for example for forming vertical or horizontal walls in particular, and may replace expanded, sandwiched and composite materials which are already known and in use.

The present invention has as its object a device of the kind described in the foregoing and which renders it possible to eliminate the prior art disadvantages already set out, by allowing the production of multiple channel structures of large dimensions, by which is meant elements comprising a very great number of individual channels.

SUMMARY OF THE INVENTION

In accordance with the invention, cylindrical forming elements comprise a lower portion of smaller diameter equipped with heating means and which delimits the said supply stage, and an upper or top portion of a greater diameter forming the die stage.

Thanks to the structure in accordance with the invention, the supply of thermoplastic material at the level of the cylindrical elements forming the extrusion head is perfectly uniform in temperature and pressure, since each of the cylindrical elements includes its own heating means. Furthermore the cooling fluid of the said cooling stage is conveyed through the said cylindrical elements. In this manner, each channel or cell-like element produced is cooled separately and immediately upon its emergence from the cylindrical elements, meaning from the extrusion head, so that a uniform overall cooling action is obtained for the product as a whole.

Furthermore, the cooling fluid thus assures retention of the geometrical configuration of the individual cells at the outlet of the cylindrical extrusion elements, thereby averting the necessity for forming or sizing means as described in the prior art.

The device preferably comprises passages for supplying the said cooling fluid, which are situated within said cylindrical elements and are separated from the internal surface of these by a layer of a heat insulating material. In this manner a heating action on the cooling fluid is prevented during its passage through the cylindrical elements.

The said top portions of the cylindrical elements are advantageously capped by a dome traversed by the said supply ducts, the said top portions being formed from a heat insulating material and the said domes being produced from a heat insulating material. These steps allow of an additional improvement of the instantaneous cooling action at the level of the outflow extremity of the cylindrical elements.

According to a particularly advantageous embodiment, the said top portions and the said domes are formed from polytetrafluoroethylene.

The device in accordance with the invention may—in known manner—include a device for withdrawing extruded material and which pulls the latter in the direction of extrusion. In this case, the withdrawal or extraction device may comprise endless driving belts equipped with protuberances which co-operate with the periphery of the product made, the speed of the said belts being positively controlled as a function of the delivery of the die stage.

If a continuous production is to be performed, the device may comprise a severing device which is of the cutting wire type and is carried by a carriage displaceable in the direction of extrusion so that the product may be cut to lengths without stopping the extruding operation.

Finally, in accordance with another advantageous embodiment the said cooling fluid may have a higher density than that of the thermoplastic material extruded, which eases and speeds up the advance of the extruded product at the level of the cooling stage. In the said cooling stage, the cooling fluid is preferably in direct contact with the said top portions and the dome of each of the cylindrical elements. The cooling action then sets in immediately following the extrusion stage and the risk of a deformation of the geometrical configuration of the individual tubes or cells is reduced complementarily.

BRIEF DESCRIPTION OF THE DRAWINGS

Other features and advantages of the invention will emerge upon perusing the following description, whilst referring to the accompanying drawings which were given solely by way of non-limiting examples, in which:

FIG 1A shows an arrangement of apparatus for producing honeycomb multiple channel structures, FIG. 2 is a diagrammatical outer view of a cylinder forming the die stage and passing through the plastics material injection stage, FIG. 3 is a diagrammatical plan view of the tops of the said cylinders, FIG. 4 is a view in cross-section of channel or tube structures of hexagonal section in the plane at right angles to the generatrix of the channel walls, FIG. 5 is a view in perspective of a part of the multiple channel or tube structure according to FIG. 4 and after parting off along two mutually parallel planes, FIG. 5 is an outer view of a modified form of the said cylinders, FIG. 7 is a view in longitudinal cross-section of the cylinder of FIG. 6 along a plane passing through its axis, FIG. 8 is a view from above of the cylinder of FIG. 6.

DETAILED DESCRIPTION OF PREFERRED EMBODIMENT

Figure 1:
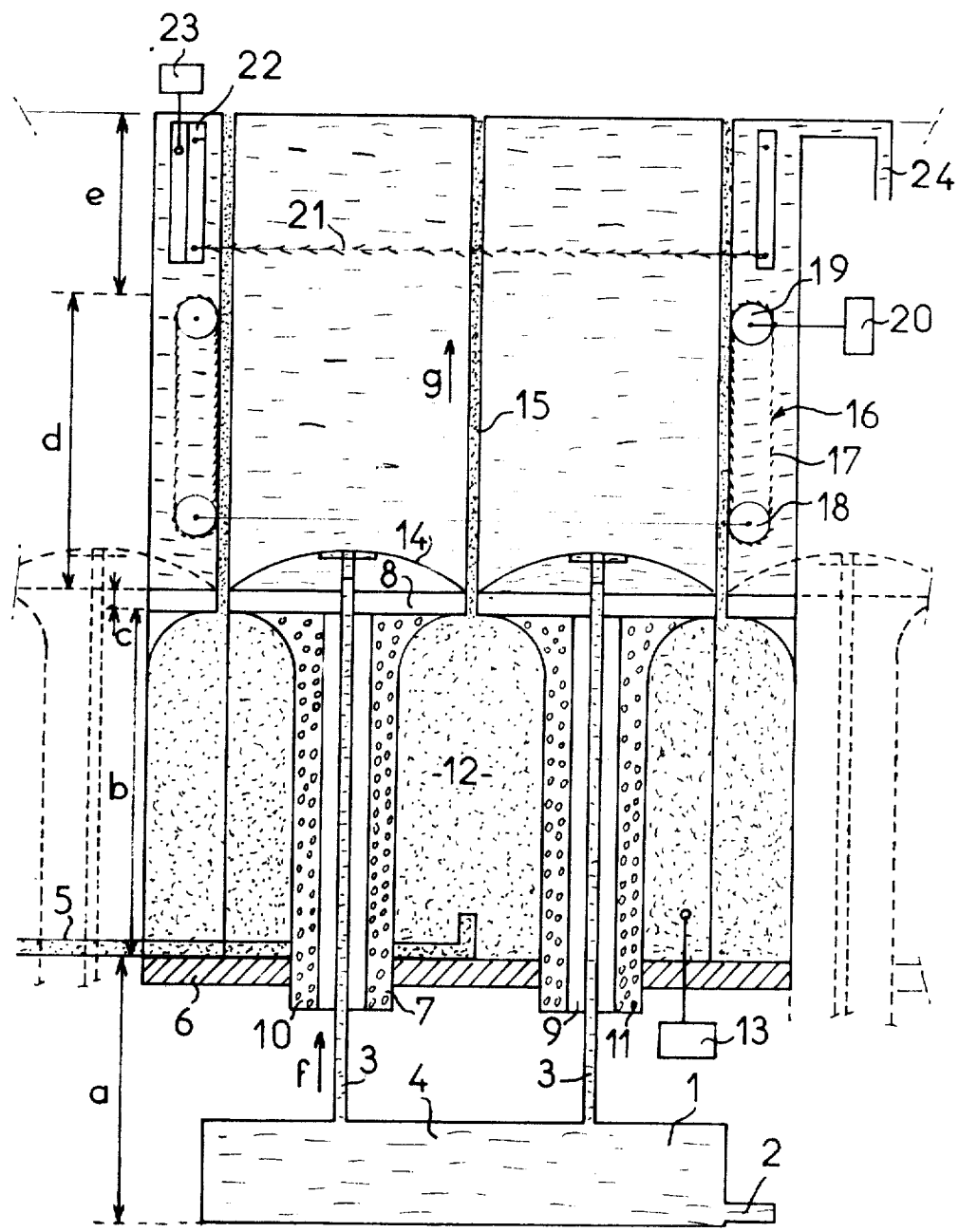
FIG. 1 is a diagrammatical overall view of one embodiment according to the present invention for the production of multiple tube structures of large dimensions.

Referring now to the accompanying drawings FIG. 1 shows a diagrammatical cross-sectional view of an apparatus for the production of multiple channel or tube structures and FIG 1A shows the apparatus structurally.

For the purpose of clearness, the plane of FIG. 1 will be assumed to be vertical.

The description and drawings specifically relate to the production of a multiple channel or tube structure whereof the tubes or channels have a uniform hexagonal cross-section; however it will be fully appreciated that the present invention encompasses all other cross-sectional forms and in particular circular, oval, elliptical or polygonal forms of regular or irregular nature in general.

As seen from the bottom to the top, the apparatus shown in FIG. 1 comprises five stages which are the following:

a stage a for the supply of a cooling fluid which comprises a tank 1 fed with cooling fluid via a pipe 2 connected either to a source of fluid or to the outlet of a cooling fluid recycling circuit. The fluid passes through the second and third stages of the apparatus, being ducted to the fourth and cooling stage d by means of small-bore pipes 3. The cooling fluid 4 travels upwards from below, from the tank 1, that is to say according to the arrow f. An insulation is incorporated along the trajectory through the second and third stages b and c of the pipes 3; this will be described in greater detail hereinafter a stage b for supplying thermoplastic material, the latter being injected in the fluid condition at the base of the stage b via an injection tube 5. The thermoplastic material utilised is at a temperature of the order of 240° C. This may for example be polypropylene. The base of the second stage b is formed by a partition 6 traversed by the cylinders 7 which also pass through the stage b as a whole and whereof the tops 8 form the third and so-called die stage c. At their centre, the cylinders 7 have a cavity 9 traversed by the cooling fluid pipes 3. The insulation between these pipes 3 and the wall 10 of the cylinders 7 is formed in this case by air. The wall 10 of the cylinder 7 is thick and provides heating, the heating action being produced by a network 11 formed either by electrical resistances or by heating fluid passages. The thermoplastic material 12 is consequently kept in the fluidstate thanks to its contact with the walls 10 of the cylinders 7, a temperature sensor 13 allowing temperature of the thermoplastic material 12 to be controlled by acting on the heating system of the walls 10 of the cylinders 7. This wall may, for example, be kept at an even temperature of the order of 250° C. The outer shape of each cylinder 7 has a flare at the top of the cylinder, at the upper section of the second stage b, in direction towards the passage orifices of the die stage c for the purpose of easing the displacement and advance of the thermoplastic material 12. Two cylinders 7 which allow production of a section of a multiple tube or channel structure comprising a central channel and incomplete peripheral channels, are illustrated in unbroken lines in FIG. 1; the dimensions of the apparatus and the number of cylinders 7 may be increased at will in such manner as to produce complete panels of multiple tube structure, that is to say structures comprising a substantial number of channels.

The die stage c is thin, insulating and comprises the tops 8 of the cylinders 7. In the example illustrated, these tops have a uniform hexagonal outline; each is capped by a dome 14. The traversal of the die stage c by the cooling fluid pipes 3 also provides insulation as stated in the foregoing, this is by the actual material of the die stage c, that is to say of the tops 8 of the cylinders 7, these being produced from a plastics material, for example such as PTFE (or polytetrafluoroethylene) or PFA (polyfluoroalkoxy). The pipes 3 pass through the respective centres of the tops 8 of the cylinders 7. The gaps left between the tops 8 of the cylinders 7 determine the cross-section of the multiple tube structure formed, which in the case illustrated in FIG. 5 is a structure in which the tubes have a regular hexagonal cross-section which renders it possible to obtain a honeycomb structure.

A cooling stage d in which the multiple tube structure obtained, and denoted as a whole by the reference 15, is cooled by the cooling fluid 4 coming from the first stage a. The cooling of the thermoplastics material issuing from the die stage c occurs comparatively quickly, and the structure is practically rigid as early as the space situated close to the domes 14 of the cylinders 7. During production, the structure as a whole develops in the direction of the arrow g. This development of the structure 15 in the direction towards the outlet of the apparatus is promoted by the archimedian thrust exercised by the cooling fluid of the stage d. To enhance this action, a cooling fluid will preferably be selected which has a high density, and which is in any event higher than the density of the plastics material forming the structurw 15. The withdrawal of the structure 15 in the direction of the arrow g is moreover performed by traction elements 16 situated at the level of the cooling stage d and exerting a light traction along g and at the same time a grip on the periphery of the structure 15. The traction elements 16 are formed by endless flexible belts 17 equipped with protuberances coming into engagement with the structure 15, these belts being received by rollers 18 and 19 of which at least one is rotated by a drive motor 20. Given that, during production, the base of the multiple tube structure, that is to say its volume situated close to the die stage c is still in the softened state, the traction elements 16 should not exert an excessive force on the structure 15 which could cause rips or at least degradations. To avert problems of this kind, the motor 20 is positively controlled, and the speed of rotation it imparts to the roller 19 depends on the delivery of the die stage c.

A fifth and final stage e for severing the structure 15 is situated in the upper portion of the apparatus. The severing of the structure 15 is performed within the actual cooling fluid. It is performed by means of a cutting wire 21 equipped with protuberance which is displaced sideways in such manner as to part the structure 15 in a plane at right angles to the axis of its cells. The wire 21 is borne by a carriage 22 comprising driving means which are not shown. Since the severing of the structure 15 occur continuously, that is to say whilst this structure develops along the arrow g, the parting acting occurs on the run and, to this end, a motor 23 draws the carriage 22 along g at the same speed as that at which the structure 15 is fed forward. After each cutting operation, the wire 21 is returned downwards in such manner as to cut and deliver another slice of the structure 15. As wire 21 is within the cooling fluid the latter acts as a lubricant during the cutting operation and renders it possible to obtain slabs or cellular structures 15 having perfectly cut edges free of burring. The cooling fluid filling the cooling stage d and the cutting stage e is discharged from the apparatus via a pipe 24, at which time it may purely and simply be discharged or recycled in the direction towards the pipe 2 supplying the bottom tank 1 after having had its optimum temperature restored and above all having been freed of the impurities it contains which originate in particular from the cutting operation by means of the wire 21.

The apparatus described herein may operate either continuously, that is to say may continuously deliver the structure 15 which is cut off in stage e, or may operate intermittently and deliver a particular quantity of structure 15. FIG. 1A shows the structure 15 being extruded after its upper end is severed along a cut line 16'.

A cylinder 7 corresponding to those appearing in the plane of FIG. 1 but lacking the dome 14, is illustrated in FIG. 2. This shows the pipe 3 passing through it from end to end, its hexagonal top 8 whereof the outer geometrical outline in conjunction with the tops 8 of the other cylinders 7 determines the cross-section of the cells of the structure 15, its flared external top portion 25 easing the passage of the plastics material in the fluid state through the passage orifices of the die stage c.

Three similar cylinders 7 are illustrated in plan view in FIG. 3. The space 26 delimited between their three tops 8 renders it possible to obtain a structure corresponding to that shown in perspective in FIG. 5 and whereof the cross-section is shown in FIG. 4.

A modified form of the cylinder 7 shown in FIG. 2 is shown in FIGS. 6 and 7. This cylinder has a hemispherical upper dome 14, a hexagonal top 8 and, again, the internal pipe 3 for traversal by the cooling fluid situated at the centre of the passage 9 providing an insulation by means of the very barrel 10 of the cylinder. The insulating nature of the top 8 forming the die stage c of the plant renders it possible to prevent heat exchanges by conduction between the barrel 10 of the cylinder and the cooling pipes 3. The pipes 3 open at the upper part of the cylinder 8 in the centre of the top dome 14.

Other plastics materials than polypropylene may be utilised to produce a multiple tube or channel structure similar to the structure 15.

A multiple tube or channel structure corresponding to that obtained by the process of the invention may be applied to produce beams, self-supporting insulating panels, or load carrying floors intended for the building industry.

A structure of this kind may be used to replace the known expanded cellular products, to produce sandwiched or composite materials, providing perfect insulation and allowing of their application within the sphere of self-supporting structures by virtue of their mechanical properties. A structure of this kind may advantageously replace the honeycomb structures produced from aluminium.

The plastics material utilised may or may not be loaded and it is possible to make use of all additives known at present to endow the same with particular physical or mechanical properties.

Once it has been obtained in the form of beams or slabs, the product of the invention may be heat-moulded in such manner as to assume an external shape corresponding to that required for its application. Its two opposed surfaces may be equipped with an additional coating, for example of glass fibres.

We claim:

1. Device for upwardly extruding a multiple tube structure from a thermoplastic material comprising:
   an extrusion die comprised of a plurality of regularly spaced cylinders having upper ends defining extrusion orifices therebetween, means mounting said cylinders in upright regularly spaced relation to each other so that there are spaces between adjacent cylinders, each cylinder having a lower portion of smaller diamter than the upper end, heating means associated with the lower portion of each cylinder, said upper ends being of a greater dimension than the lower portion and of a heat insulating material;
   supply means for injecting fluid thermo-plastic material to a bottom region of each space between the adjacent cylinders;
   a liquid cooling bath above and in direct contact with the upper ends of the cylinders;
   a cooling liquid passage extending through each cylinder in thermally insulated relation to the cylinder;
   means for supplying liquid to said cooling bath through said passages extending through each cylinder, traction means in said cooling bath for pulling extruded multiple tube structure solidified by said bath upwardly through the bath, and cutting means in said liquid cooling bath for cutting the solidified multiple tube structure.

2. Device according to claim 1 wherein the upper ends of said cylinders are capped by domes of heat insulation material.

3. Device according to claim 2 wherein said domes are of polytetrafluoroethylene.

4. Device according to claim 1 wherein the upper ends of the cylinders comprise a thermoplastic material with a melting point much higher than the temperature of the extruded material.

5. Device according to claim 1 wherein said traction means comprise endless driving belts having protuberances engaging the periphery of the extruded material, and means for controlling the speed of the belts as a function of the rate of extrusion of the cell structure.

6. Device according to claim 1 wherein said cutting means comprises a severing device carried by a carriage which is movable in the direction of extrusion to cut the extruded material without stopping the extrusion.

7. Device according to claim 6 wherein said severing device comprises a cutting wire.

8. Device according to claim 1 wherein the cooling liquid bath comprises a liquid of a density greater than the extruded thermoplastic material.

* * * * *